United States Patent [19]

Arndt et al.

[11] Patent Number: 4,573,773

[45] Date of Patent: Mar. 4, 1986

[54] PERISCOPE-LIKE SIGHTING DEVICE

[75] Inventors: Klaus Arndt, Mägenwil; Saverio Sanvido, Glattbrugg, both of Switzerland

[73] Assignee: Contraves AG, Zürich, Switzerland

[21] Appl. No.: 606,398

[22] Filed: May 2, 1984

[30] Foreign Application Priority Data

May 17, 1983 [CH] Switzerland ............. 2671/83

[51] Int. Cl.[4] ............. G02B 23/04; G02B 23/08; G02B 23/16
[52] U.S. Cl. ................... 350/541; 350/540; 350/569
[58] Field of Search ......... 350/500, 538–544, 350/569, 571, 321, 561; 356/7, 18, 20, 140, 144, 147

[56] References Cited

U.S. PATENT DOCUMENTS

| 1,429,981 | 9/1922 | Taylor et al. | 356/7 |
| 1,697,293 | 1/1929 | Sperry | 356/144 |
| 2,420,506 | 5/1947 | Strang | 356/7 |
| 4,108,551 | 8/1978 | Weber | 356/4 |
| 4,170,404 | 10/1979 | Meye et al. | 350/321 |
| 4,260,217 | 4/1981 | Traeger et al. | 350/541 |
| 4,291,937 | 9/1981 | Baudot | 350/539 |
| 4,295,708 | 10/1981 | Albrecht et al. | 350/289 |
| 4,386,848 | 6/1983 | Clendenin et al. | 350/500 |

FOREIGN PATENT DOCUMENTS 2926973 1/1981 Fed. Rep. of Germany .

*Primary Examiner*—William H. Punter
*Attorney, Agent, or Firm*—Werner W. Kleeman

[57] ABSTRACT

A periscope-like sighting device is proposed which comprises an optical system comprising a plurality of elements arranged within a housing for localizing and tracking a target. In order to obtain as great as possible a field of observation, the optical system comprising a first deflection prism, an objective lens or lens system, a first beam splitter, a second beam splitter and a second deflection prism is arranged in the housing sloping backward in the direction of incident radiation and in relation to a vertical rear housing wall. A main mirror is associated with the first beam splitter and is journaled in a mirror head arranged sloping backward in the housing to be pivotable about a first axis and rotatable about a second axis. In order to achieve a range-finding of the target, a laser range finder can be arranged on the housing of the sighting device and is preferably subdivided into a laser transmitter portion and a laser receiver portion and the principal components of the laser receiver portion are arranged within the housing.

11 Claims, 8 Drawing Figures

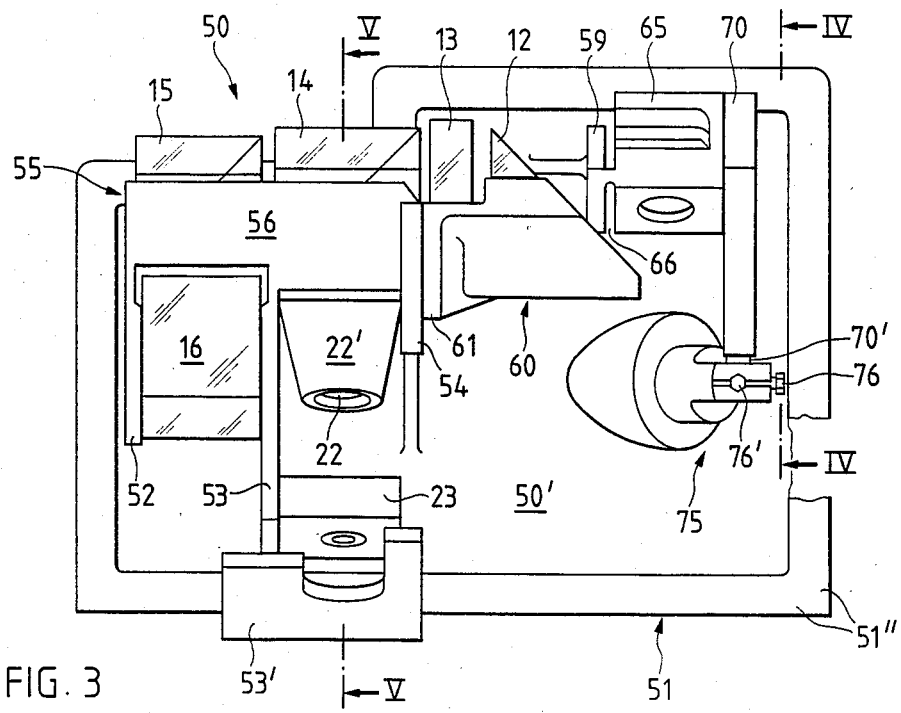
FIG. 3
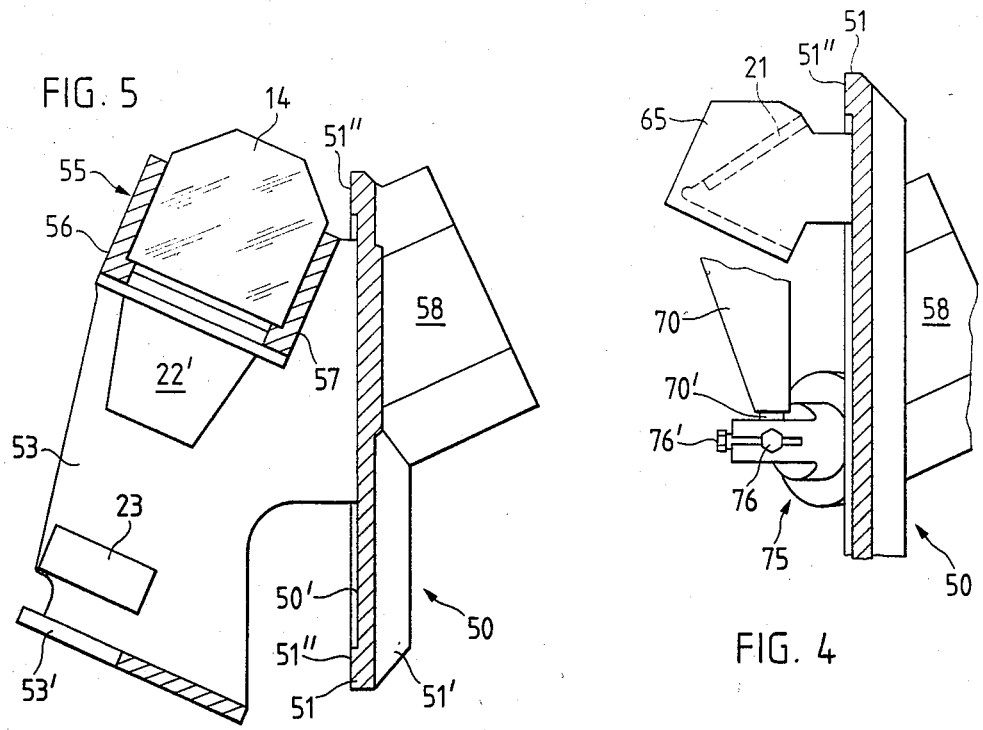
FIG. 5
FIG. 4

PERISCOPE-LIKE SIGHTING DEVICE

CROSS REFERENCE TO A RELATED APPLICATION

This application is related to our commonly assigned, copending U.S. application Ser. No. 06/606,399, filed May 2, 1984, and entitled "Optical System For A Sighting Device."

BACKGROUND OF THE INVENTION

The present invention broadly relates to sighting devices and, more specifically, pertains to a new and improved construction of a periscope-like sighting device having a multiple-element optical system or an optical system comprising a plurality of elements and which is arranged within a housing and is intended for the spatial localization and tracking of a target.

SUMMARY OF THE INVENTION

It is a primary object of the present invention to provide a new and improved construction of a periscope-like sighting device which does not have associated with it drawbacks and shortcomings of prior art constructions.

Another and more specific object of the present invention aims at providing a new and improved construction of a periscope-like sighting device of the previously mentioned type in which the individual optical elements are arranged within a housing to achieve as great as possible a field of observation.

Yet a further specific object of the present invention aims at providing a new and improved construction of a periscope-like sighting device of the character described which is relatively simple in construction and design, extremely economical to manufacture, highly reliable in operation, not readily subject to breakdown or malfunction, and requires a minimum of maintenance and servicing.

Now in order to implement these and still further objects of the invention, which will become more readily apparent as the description proceeds, the periscope-like sighting device of the present invention is manifested by the features that the optical system comprises a first deflecting prism, an objective lens means, a first beam splitter, a second beam splitter, a second deflecting prism and a main mirror associated with the first deflecting prism, the main mirror and the optical system being arranged sloping backward from bottom to top in a direction of incident radiation and in relation to a substantially vertical rear wall of the housing, the main mirror being mounted in a mirror head and arranged sloping backward in the housing to pivot about a first axis and being rotatably mounted about a second axis conjointly with the mirror head. The incident radiation may be visible or invisible radiation, or both.

According to a further feature of the invention, the sighting device is provided with a conventional laser range finder for determining the distance to the target. The laser transmitter portion of the laser range finder is arranged on the rear side of the sighting device housing and a further deflection mirror is associated with the main mirror as well as with the first beam splitter of the optical system of the laser receiver portion of the laser range finder.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 3 schematically shows a frontal view of the optical elements arranged on a carrier member as a sub-assembly on an enlarged scale;

FIG. 4 schematically shows a section along the line IV—IV of FIG. 3 with the adjustment apparatus arranged on the carrier member;

FIG. 5 schematically shows a section along the line V—V of FIG. 3 through the carrier member;

DETAILED DESCRIPTION OF THE PREFERRED EMBODIMENTS

Figure 1:
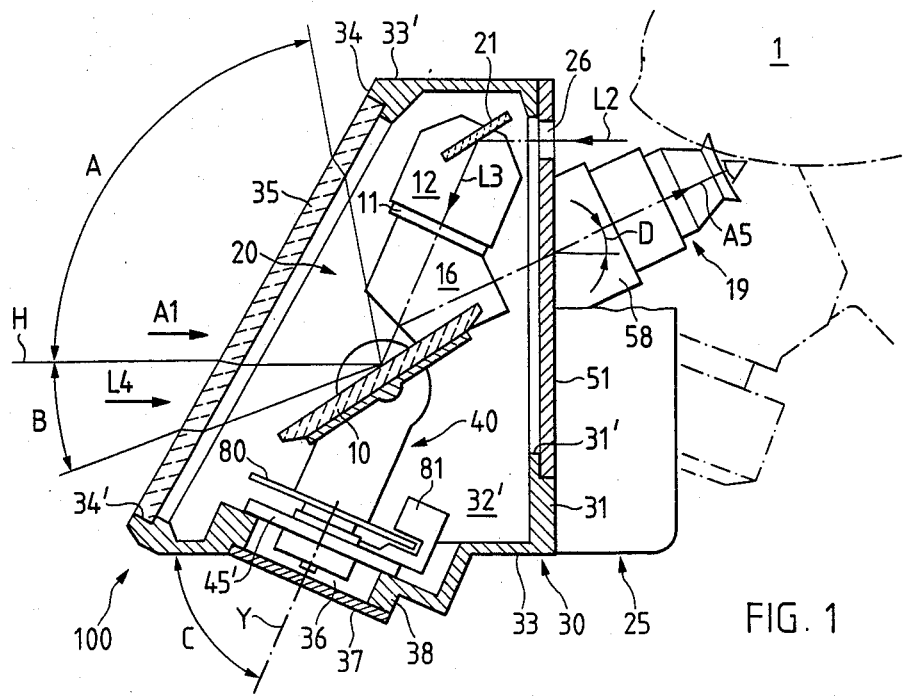
FIG. 1 schematically shows a side view of the sighting device in section with the arrangement of the optical elements and of a laser range finder.

Describing now the drawings, it is to be understood that to simplify the showing of the drawings only enough of the structure of the periscope-like sighting device has been illustrated therein as is needed to enable one skilled in the art to readily understand the underlying principles and concepts of this invention. The exemplary embodiment of the periscope-like sighting device illustrated in FIGS. 1 and 2 is designated with the reference numeral 100 and will be seen to comprise a housing 30, an optical system 20 formed from a plurality of elements as well as an integrated laser range finder 25 formed from a plurality of elements.

Figure 2:
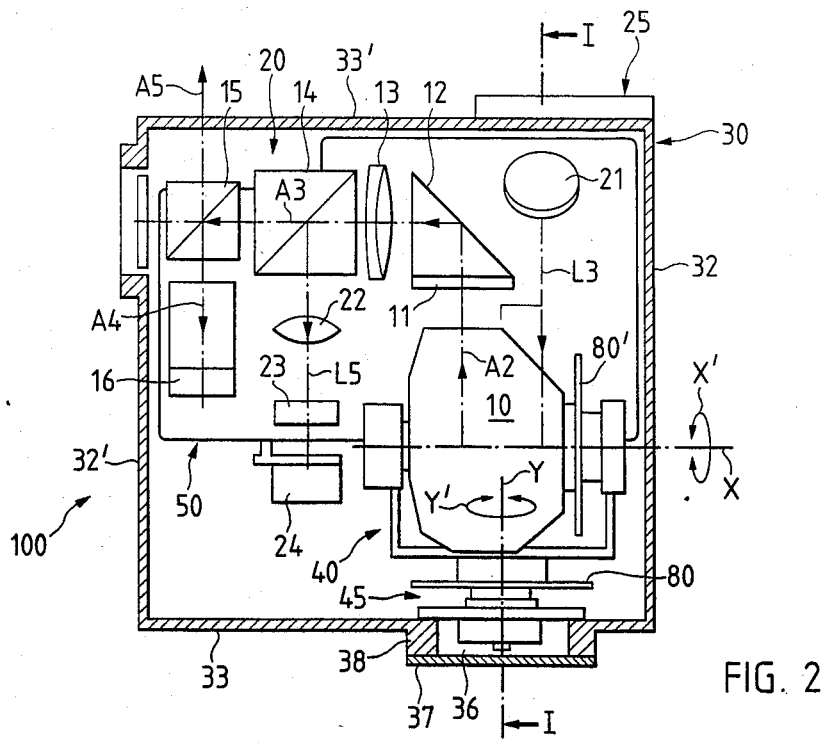
FIG. 2 schematically shows a frontal section of the sighting device according to FIG. 1.

FIG. 1 shows the schematically represented sighting device in section according to the line I—I of FIG. 2. There will be seen the housing 30, the optical system 20 as well as the partially represented laser range finder 25. The housing 30 principally formed by side walls 32 and 32', a substantially vertical rear wall 31 as well as an upper floor 33' and a lower floor 33 has a sloping front wall 34 arranged on the side opposite to the rear wall 31 and sloping backward from bottom to top. An opening 34' constructed as a window is provided in the front wall 34 and is closed by means of a glass cover plate 35 and not particularly shown fastening means.

The optical system 20 formed from the individual elements comprises, as seen in the direction of optical radiation A1, A2, A3, A4 and A5 in FIGS. 1 and 2, a main mirror 10 pivotably journaled in a mirror head 40, a first deflection prism 12 provided with an optical aperture or diaphragm 11, an objective lens 13, a first beam splitter 14, a second beam splitter 15, a second deflection prism 16 as well as an ocular or eye-piece 19 for viewing by an observer 1.

The sighting device 100 is arranged upon a not particularly shown support or carrier, for instance upon a weapon, and may be trained on an object or target conjointly with the weapon in elevation and azimuth. The mirror head 40 arranged in the sighting device 100, on the one hand, and the main mirror 10, on the other hand, can be rotated and pivoted relative to the motion of the weapon. The main mirror 10, as shown in FIG. 2, is pivotable about a first axis X in the direction of the arrow X' and is rotatable conjointly with the mirror head 40 about a second axis Y in the direction of the arrow Y'. The range of rotation in the direction of the arrow Y' of the mirror head 40 amounts to about 27° to the left and to the right. To achieve as great as possible a pivoting motion of the main mirror 10 composed of the angles A and B, the mirror head 40 is slopingly arranged and journaled in the housing 30 at an angle C in relation to the lower floor 33 as seen in the direction of the rear wall 31 as illustrated in FIG. 1.

At a slope angle C of the mirror head 40 of about 66°, a preferred geometrical arrangement is obtained having an optimum angle of elevation A of about +80° relative to a horizontal plane H and an optimum angle of depression B of about −20°.

As shown in FIG. 1, in order to obtain as great as possible a field of observation through the sighting device 30, the ocular or eye-piece 19 is slopingly arranged at an angle D on the rear wall 31 of the housing 30. The viewing angle designated as D is about 25°. With this arrangement, the observer 1 can both look into the ocular or eye-piece 19 and monitor the free observation field above the sighting device for any necessary general orientation by means of a slight nodding motion of the head.

The elements 12, 13, 14, 15 and 16 of the optical system 20 shown in FIGS. 1 and 2, as well as the deflection mirror 21 associated with the main mirror 10, are arranged in the housing 30 according to the slope angle of the mirror head 40. The optical system 20 is principally arranged upon a carrier member 50 a portion 51 of which forms the rear wall 31, as will be described in detail in the following.

FIG. 3 schematically shows the carrier member 50 on an enlarged scale. The carrier member 50 comprises a plate-like portion 51 provided with a surrounding bearing surface 51" and is constructed at its inner side 50' for the reception and fastening of the optical elements. The carrier member 50 has a pocket 55 essentially constituted by web members 52, 53 and 54 and a front flange 56 as well as a rear flange 57, as can be seen in FIG. 5. The pocket 55 is constructed to receive the second deflection prism 16, the second beam splitter 15, the first beam splitter 14 as well as a first lens 22. The components 16, 15, 14 and 22 are restrained in the pocket 55 by any suitable means not particularly shown. A lens system 23 as well as a laser receiver portion 24 of the laser range finder 25 are fastened to the web member 53 as well as to a flange 53' by likewise any suitable means not particularly shown, as can be seen in FIG. 2.

A carrier 60 constructed in pocket-like manner is fastened by any suitable fastening means to a flange 61 on the central web 54 for receiving the first deflection prism 12 as well as the objective lens 13 which may be fixed in a certain position on the carrier or carrier member 60.

A retaining member 65 for the deflection mirror 21 is fastened to a further web 59 of the carrier or carrier member 50, on the one hand, and to an adjustment lever 70, on the other hand, by suitable fastening means not particularly shown, as can be seen in FIGS. 3 and 4. The adjusting lever 70 arranged and fastened with one of its ends on the retaining member 65 has its other end operatively connected to a correspondingly associated bearing 75 arranged on the carrier 50. Two adjustment screws 76 and 76' arranged on the bearing 75 act upon a journal 70' of the adjusting lever 70. The retaining member 65 provided with a corresponding expansion or clamping slot 66 and carrying the deflection mirror 21 is adjustable by means of the adjustment lever 70 by correspondingly rotating the adjustment screws 76 and 76'.

A precise deflection of the laser beam L2, L3 transmitted by the laser range finder 25 and oriented coaxially to the incident visible radiation onto the reflecting surface of the main mirror 10 is obtained by means of the adjustability of the components 65 and 70 just described.

As shown in FIGS. 1 and 2, the laser beam L2 penetrates an aperture or opening 26 correspondingly arranged in portion 51, is directed by the deflection mirror 21 as the beam L3 to the main mirror 10 and from there to the object or target and is correspondingly reflected from the latter. The invisible laser beam L4 reflected from the object or target to the main mirror 10 travels substantially parallel to the incident visible radiation A1.

FIG. 4 shows a section along the line IV—IV of FIG. 3 and the portion 51 of the carrier member 50 can be seen, as can an integrally formed and partially represented carrier part 58 for the ocular or eye-piece 19, the bearing 75 provided with the adjustment screws 76 and 76', a portion of the adjustment lever 70 with the journal 70' as well as the retaining member 65 for the deflection mirror 21.

FIG. 5 shows a section along the line V—V of FIG. 3 and the first beam splitter 14 arranged in the pocket 55 can be seen, as can the lens 22 arranged in a retaining body 22', the lens body 23 as well as the web 53 integrally formed on the inner side 50' of the carrier member 50 with the flange 53' for fastening the laser receiver 24. The components 14, 22 and 23 schematically illustrated in FIG. 5 are not shown in section for simplicity of representation.

There can further be seen the bearing surface 51" arranged on the inner side 50' as well as the integrally formed walls 56 and 57 of the pocket 55 sloping back at an angle relative to the portion 51. A plurality of ribs 51' arranged in parallel spaced relationship to one another as well as the carrier part 58 are arranged on the other side of portion 51.

The carrier member 50 previously described in relation to FIGS. 3, 4 and 5 and comprising the components 55, 58, 60, 65 and 70 as well as the optical elements 12, 13, 14, 15, 16, 22 and 23 is constructed as a sub-assembly or modular unit and, as shown in more detail in FIG. 1, is installed in the housing 30 through an opening or aperture 31' and fastened with not particularly shown means. The portion 51 of the carrier member 50 forms a part of the rear wall 31.

Figure 6:
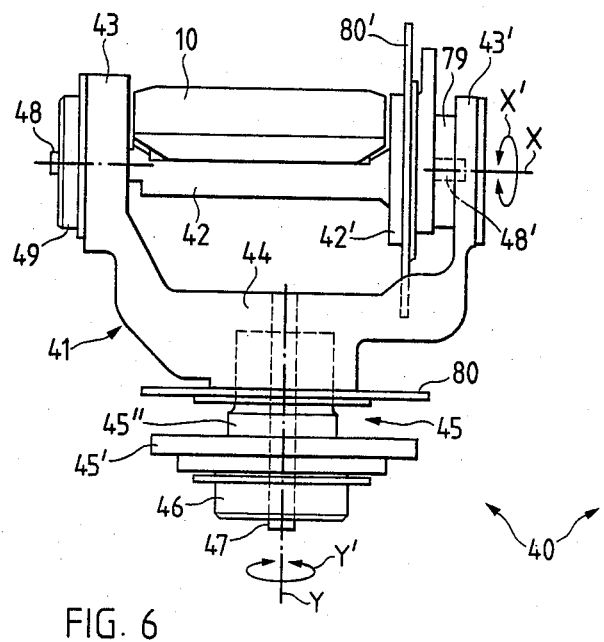
FIG. 6 schematically shows a frontal view of the mirror head for the main mirror of the sighting device according to FIG. 1.
Figure 7:
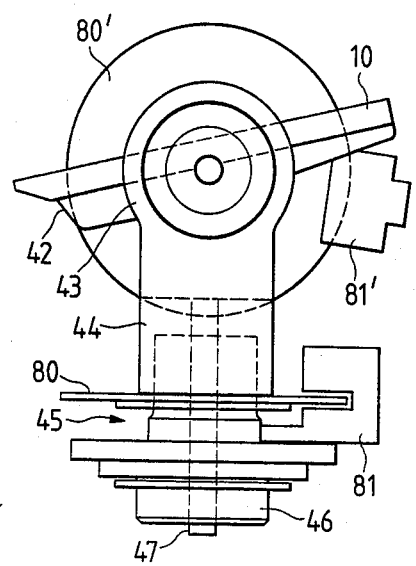
FIG. 7 schematically shows a side view of the mirror head according to FIG. 6.

The mirror head designated in its entirety with the reference numeral 40 and carrying the main mirror 10 represented in various positions is represented in FIGS. 6 and 7 and will be described in detail in the following:

The mirror head 40 substantially comprises a carrier body 41, a carrier plate 42 for the main mirror 10, a support body 45 as well as a first code disk 80 and a second code disk 80'. A coding device 81, 81' schematically represented in FIG. 7 is associated with each of the code disks 80 and 80' for monitoring the momentary angular position of the main mirror 10 or of the mirror head 40. The carrier body 41 has, as can be seen in FIG. 6, a substantially U-shaped profile or section with two side members 43 and 43' integrally formed on a base portion 44. The support body 45 is constructed as a hollow shaft and has a flange portion 45' as well as a shaft body 45" which is constructed for journaling the base portion 44 which is provided with a not particularly shown cylindrical reservation or aperture.

A housing-like bushing body 46 is fastened at the underside of the support body 45 by not particularly shown means to receive a not particularly shown first drive mechanism. The bushing body 46, the support body 45 as well as the base portion 44 of the carrier body 41 are penetrated by a drive shaft 47 indicated in broken lines which is operatively connected to the carrier body 41 on one side and with a not particularly shown first drive mechanism on the other side.

The carrier plate 42 arranged between the two side members 43 and 43' of the carrier body 41 is journaled in the side members 43 and 43' at both sides by integral shaft journals 48 and 48'. On one side, the shaft journal 48 is operatively connected to a not particularly shown second drive mechanism and the second drive mechanism is arranged in a housing-like bushing body 49 fastened to the side member 43. The carrier plate 42 is provided with an integrally formed flange 42' on the other side upon which the second code disk 80' is appropriately fastened. A bushing body 79 is arranged in the side member 43' in which the shaft journal 48' is journaled.

The mirror head 40 previously described in relation to FIGS. 6 and 7 is, as shown in FIGS. 1 and 2, arranged in the region of a reinforced floor part 38 provided with a reservation or aperture 36 and appropriately fastened to the flange portion 45' on the inner side of the floor part. The reservation or aperture 36 is closed by a plate 37 after mounting the mirror head 40.

The two not particularly shown or designated drive mechanisms arranged in the bushing bodies 46 and 49 are so-called torquers or torque generators by means of which the mirror head 40 on the one hand can be rotated conjointly with the main mirror 10 about the second axis Y in the direction of the arrow Y' and the main mirror 10 journaled in the carrier body 41 can be pivoted about the first axis X in the direction of the arrow X' on the other hand. The pivoting motion of the main mirror 10 in the direction of the arrow X' corresponds to an elevational adjustment and the rotary motion of the mirror head 40 with the main mirror 10 in the direction of the arrow Y' corresponds substantially to an azimuthal adjustment.

Figure 8:
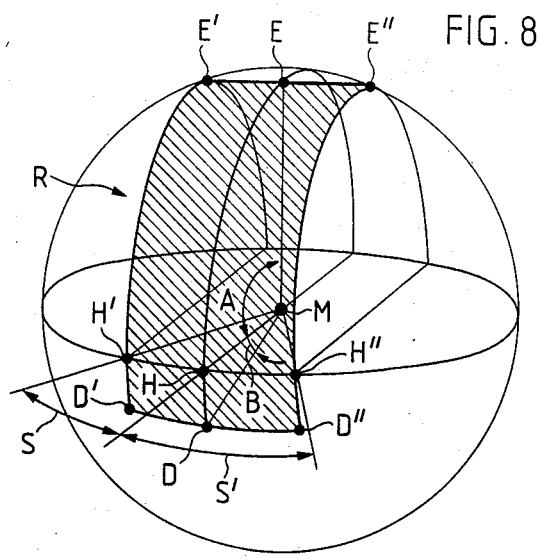
FIG. 8 is a diagram for explaining the coordinates which can be reached by the rotary and pivoting motions of the main mirror mounted in the sighting device housing.

FIG. 8 diagramatically shows in cross-hatching the field of observation R attainable from the center of the field of vision M by means of the rotary motion about the second axis Y, on the one hand, and by means of the pivoting motion about the first axis X, on the other hand.

The mirror head 40 with the main mirror 10, as schematically indicated in FIG. 8, can be laterally rotated in the horizontal plane H to a first position H' as well as to a second position H" and, with partial adaptive adjustment of the corresponding lateral angle, pivoted through the elevational or depressional adjustment range into the positions E, E' or E", respectively D, D' or D", for the purpose of tracking or following a moving target or for the purpose of seeking or localizing a target. The elevational or depressional adjustment must be correspondingly coordinated with the lateral rotary adjustment.

Experiments have shown that the substantially rectangular field of observation R schematically represented in FIG. 8 can be analyzed while maintaining ergonomically optimum viewing conditions based upon an elevational angle A of about $+80°$ relative to the horizontal plane H and a depression angle B of about $-20°$ as well as lateral angles S, respectively S', of about 15° each.

The initially mentioned laser range finder 25 provided for the sighting device 100 has a laser transmitter portion not particularly shown or designated as well as a laser receiver portion arranged spatially remote from the transmitter portion. The laser receiver portion comprising the components 22, 23 and 24 is essentially integrated into the optical system 20 arranged upon the carrier member 50 and is arranged within the sighting device housing 30.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A periscope-like sighting device comprising:
   a housing;
   a multiple-element optical system arranged in said housing and intended for the localization and tracking of a target,
   said optical system comprising:
     a first deflecting prism;
     objective lens means;
     a first beam splitter;
     a second beam splitter;
     a second deflecting prism;
   a main mirror operatively associated with said first deflecting prism;
   said main mirror and the optical system being arranged in the housing to slope backward from bottom to top in relation to a substantially vertical rear wall of the housing in a direction of incident radiation;
   the main mirror being mounted in a mirror head arranged sloping backward in the housing to perform a pivoting motion about a first axis; and
   the main mirror being mounted to perform a rotating motion about a second axis conjointly with said mirror head.

2. The sighting device as defined in claim 1, wherein: said incident radiation is visible radiation.

3. The sighting device as defined in claim 1, wherein: said incident radiation is invisible radiation.

4. The sighting device as defined in claim 1, wherein: said optical system is arranged upon a carrier member to be installed as a sub-assembly in the housing.

5. The sighting device as defined in claim 1, wherein: a retaining member is arranged on said vertical rear wall of the housing at an angle of essentially 25° relative to the vertical rear wall of the housing for accommodating an ocular.

6. The sighting device as defined in claim 5, further including:
   a carrier member for supporting said optical system; and said retaining member for said ocular is arranged upon said carrier member and forms a constructional unit therewith.

7. The sighting device as defined in claim 1, wherein:
said mirror head comprises:
   a first code disk;
   a second code disk;
   integral drive mechanisms for said pivoting motion and said rotating motion; and
the mirror head being constructed as a sub-assembly and arranged in a sloping orientation in the housing and fixed to a floor of the housing.

8. The sighting device as defined in claim 1, wherein:
said mirror head is essentially U-shaped and has two essentially vertical side members;
said mirror head comprising a carrier plate for said main mirror; and
said carrier plate being journaled in said two side members to pivot about said first axis.

9. The sighting device as defined in claim 1, further including:
   a carrier member for supporting said optical system;
   a laser range finder fixed to said vertical rear wall of the housing; and
   said laser range finder possessing a receiver portion integrated into said optical system and arranged in the housing conjointly with said carrier member.

10. The sighting device as defined in claim 9, wherein:
   a first lens, a lens system and said laser receiver portion of said laser range finder as well as a deflecting mirror associated with said main mirror are arranged and restrained on said carrier member.

11. The sighting device as defined in claim 1, wherein:
said housing contains a front wall opposite to said substantially vertical rear wall of said housing; and
said front wall sloping backward from bottom to top in relation to said substantially vertical rear wall in the direction of the incident radiation.

* * * * *